United States Patent
Cordeiro

(10) Patent No.: US 8,374,142 B2
(45) Date of Patent: Feb. 12, 2013

(54) LINK ADAPTATION IN DIRECTIONAL WIRELESS NETWORKS

(75) Inventor: Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 303 days.

(21) Appl. No.: 12/800,171

(22) Filed: May 10, 2010

(65) Prior Publication Data

US 2011/0274054 A1    Nov. 10, 2011

(51) Int. Cl.
*H04W 4/00* (2009.01)
(52) U.S. Cl. .......................................... 370/329
(58) Field of Classification Search .................. 370/203, 370/204–215, 229–240, 310–337, 338–350, 370/395.1, 395.3, 395.4, 395.41, 395.42, 370/395.5, 395.52, 395.53, 412–421, 431–529
See application file for complete search history.

(56) References Cited

U.S. PATENT DOCUMENTS

| | | | |
|---|---|---|---|
| 2005/0201486 A1* | 9/2005 | Han et al. | 375/295 |
| 2005/0254513 A1* | 11/2005 | Cave et al. | 370/445 |
| 2007/0153748 A1* | 7/2007 | Shapira | 370/338 |
| 2007/0195811 A1* | 8/2007 | Basson et al. | 370/441 |
| 2007/0230373 A1* | 10/2007 | Li et al. | 370/267 |
| 2007/0258541 A1* | 11/2007 | Yamaura | 375/267 |
| 2009/0233545 A1* | 9/2009 | Sutskover et al. | 455/25 |
| 2010/0111215 A1* | 5/2010 | Nandagopalan et al. | 375/267 |
| 2010/0246541 A9* | 9/2010 | Kim | 370/338 |
| 2011/0273977 A1* | 11/2011 | Shapira et al. | 370/208 |

* cited by examiner

*Primary Examiner* — Kwang B Yao
*Assistant Examiner* — Jung-Jen Liu
(74) *Attorney, Agent, or Firm* — Forefront IP Lawgroup, PLLC

(57) ABSTRACT

Embodiments of techniques to perform link adaptation in directional wireless networks are presented herein.

12 Claims, 4 Drawing Sheets

LINK ADAPTATION IN DIRECTIONAL WIRELESS NETWORKS

BACKGROUND

Millimeter-wave (mmWave) wireless local and personal area networks (Wlan and WPAN, respectively) communication systems operating in the 60 Gigahertz (GHz) frequency band are expected to provide several Gigabits per second (Gbps) data throughput. An mmWave communication link operating in the 60 GHz band has unique characteristics that make it significantly different than radios operating in the traditional 2.4 and 5 GHz license free bands. These qualities give 60 GHz millimeter wave band radios operational advantages not found in other wireless systems.

However, an mmWave communication link (e.g., at 60 GHz) is significantly less robust than those that operate at lower frequencies (e.g., 2.4 GHz and 5 GHz), due for example, to oxygen absorption and high attenuation through obstructions. The use of directional antennas in an mmWave communication system can make the directional link, or beamforming (BF) link, very sensitive to mobility of stations and the environment. Even a slight change in the orientation of a station (STA) or the movement of a nearby object or person may break the BF link, particularly for small bandwidth links.

Inherent in wireless communication system is the need for improving throughput and reliability. In particular, in regards to an mmWave WLAN and WPAN, there is a need to minimize the negative impact of a BF link breakage. Stations (STA) may need to quickly detect and revert to a state where the BF link between two stations is reestablished upon a breakdown of the BF link. Thus, a need exists for techniques to improve mmWave WLAN and WPAN system throughput and reliability.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

In the following discussion, an exemplary environment is first described that is operable to perform link adaptation in directional wireless networks. Exemplary procedures are then described that may be employed in the exemplary environment, as well as in other environments.

Exemplary Environment

Figure 1:
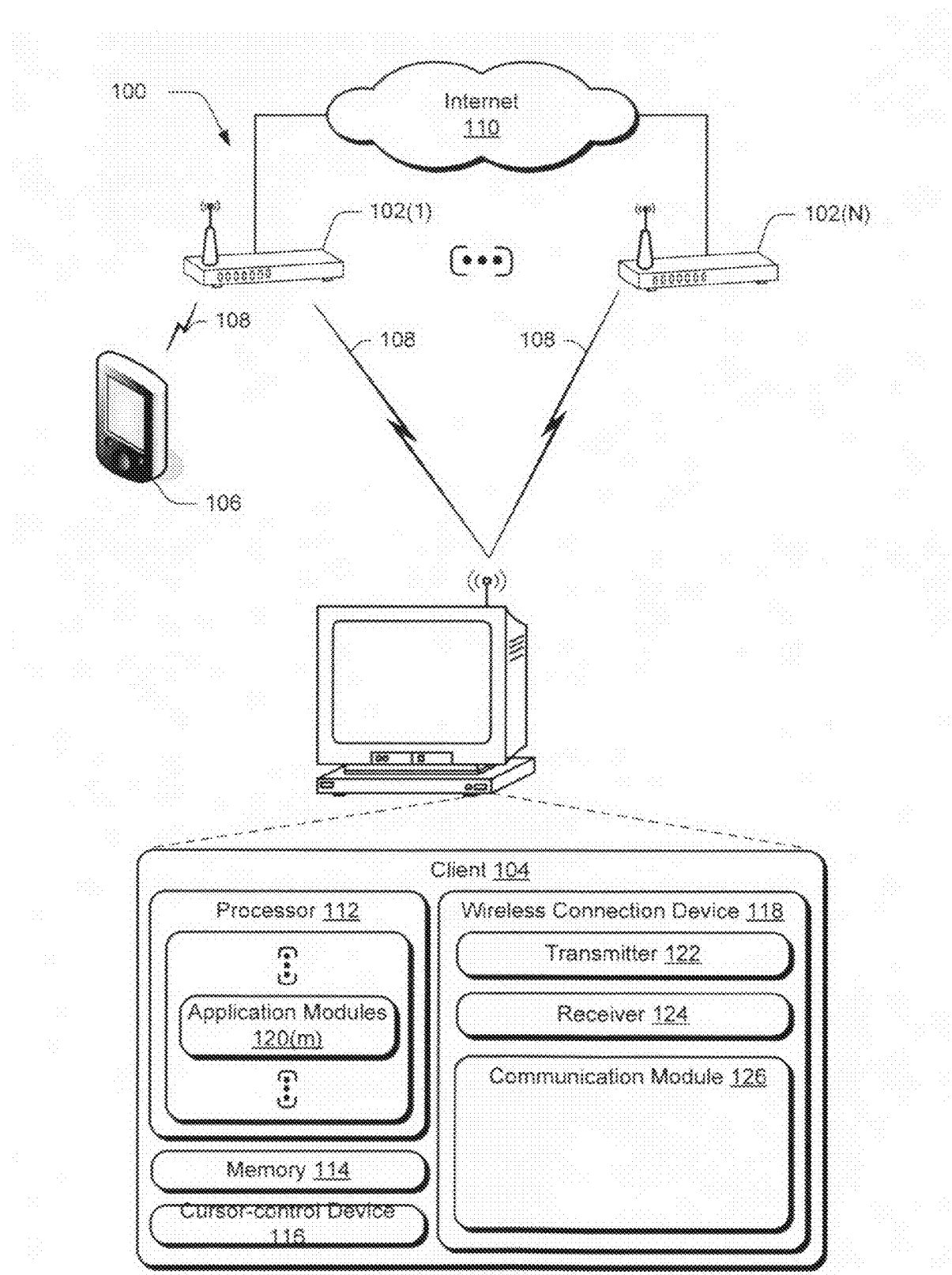
FIG. 1 is an illustration of an environment in an exemplary implementation that is operable to employ techniques to perform link adaptation in directional wireless networks.

FIG. 1 is an illustration of an environment 100 in an exemplary implementation that is operable to employ techniques to perform link adaptation in directional wireless networks. The illustrated environment 100 includes a plurality of network stations 102(1)-102(N), a client 104 and another client 106 that are communicatively coupled via a wireless network 108, which is illustrated through the use of bolts in FIG. 1. In the illustrated implementation, the network stations 102(1)-102(N) are configured to provide access to the Internet 110, but may also be configured not to provide outside access or to provide access to a variety of other networks, such as a corporate intranet, a wireless personal area network, a wireless local area network, a wireless wide area network, and so on.

The clients 104, 106 may be configured in a variety of ways for wireless network 108 access. For example, one or more of the clients 104, 106 may be configured as a computing device, such as a desktop computer, a mobile station, an entertainment appliance, a wireless phone, a personal digital assistant, and so forth. Thus, the clients 104, 106 may range from full resource devices with substantial memory and processor resources (e.g., personal computers) to low-resource devices with limited memory and/or processing resources (e.g., personal digital assistants). The clients 104, 106, in portions of the following discussion, may also relate to a person and/or entity that operate the clients. In other words, one or more of the clients 104, 106 may describe logical clients that include users, software, and/or devices.

The client 104 in the illustrated environment 100 includes a processor 112, memory 114, a cursor-control device 116 and a wireless connection device 118. Further, the client 104 is illustrated as-executing one or more application modules 120(m) on the processor 112, which are storable in memory 114. For example, the cursor-control device 116 may be utilized to provide inputs to application modules 120 to provide a wide variety of functionality, such as to navigate the Internet 110 using a web browser, perform instant messaging, and so on. Thus, the application modules 120(m) may include functionality enabled at least in part through use of the wireless network 108.

Processors are not limited by the materials from which they are formed or the processing mechanisms employed therein. For example, processors may be comprised of semiconductor (s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 114 is shown, a wide variety of types and combinations of memory may be employed, such as random access memory (RAM), hard disk memory, removable medium memory, and other types of computer-readable media.

The wireless connection device 118 is configured to provide wireless communication, such as with the network stations 102(1)-102(N). As such, the wireless connection device 118 includes a transmitter 122 to transmit data (e.g., packets) and a receiver 124 to receive data. The wireless connection device 118 is also illustrated as having a communication module 126 that is representative of functionality to manage communication performed by the wireless connection device 118.

For example, the wireless network 108 may be used to communicate a wide variety of wireless traffic between a plurality of devices, e.g., the network stations 102(1)-102(N), the clients 104, 106, and so on. In particular, the network stations may employ an mmWave communication link that utilizes directional antennas to create a beamform (BF) link.

Figure 2:
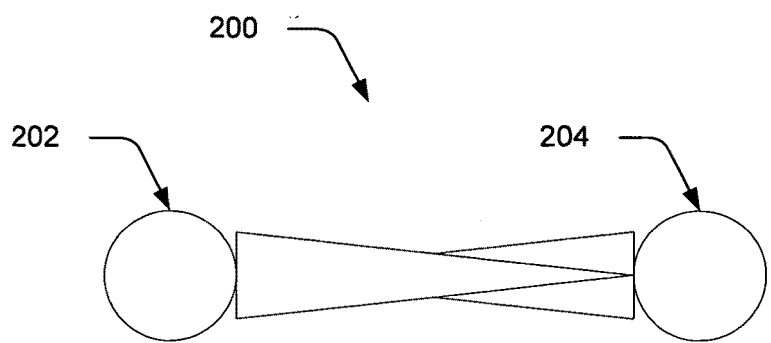
FIG. 2 is an illustration of an environment in an exemplary implementation that is operable to employ techniques to perform link adaptation in directional wireless networks.

FIG. 2 depicts a system 200 that is operable to employ link adaptation in a directional wireless network. System 200 has a transmitting station 202 and a receiving station 204. Initially, the two stations have not yet communicated data, i.e., exchanged frames, and hence have not yet created a BF link with each other. In this situation, whether during reserved service periods (SPs) or contention-based periods (CBPs), one of the stations (e.g., the receiving station 204) will set its receive antenna to an omni-receive mode. While in the omni-receive mode, the receiving station is ready to receive frames from other stations (e.g., transmitting station 202). If the receiving station 204 is not in the omni-receive mode, the transmitting station 202 may not be able to form a BF link with the receiving station 204.

Without taking beamforming into account, a typical link adaptation algorithm at a transmitter station performs one or more actions to recover a link between two stations. These actions may include attempting to retransmit the lost frames R (wherein R is a predefined number) number of times, changing the modulation and coding scheme (MCS) or modulating the transmit power. Other actions may also be employed to reestablish or bolster the communication between two stations.

When taking beamforming into account, however, existing link adaptation algorithms are not prepared to deal with links that are directional. Because the link is directional, traditional adaptation actions used to recover a lost packet may not be useful.

In FIG. 2, transmitting station 202 and receiving station 204 setup a BF link for frame exchanges between them. Assuming no disruption to the BF link is created during this time, traditional link adaptation algorithms may be sufficient to deal with packet loses.

Figure 3:
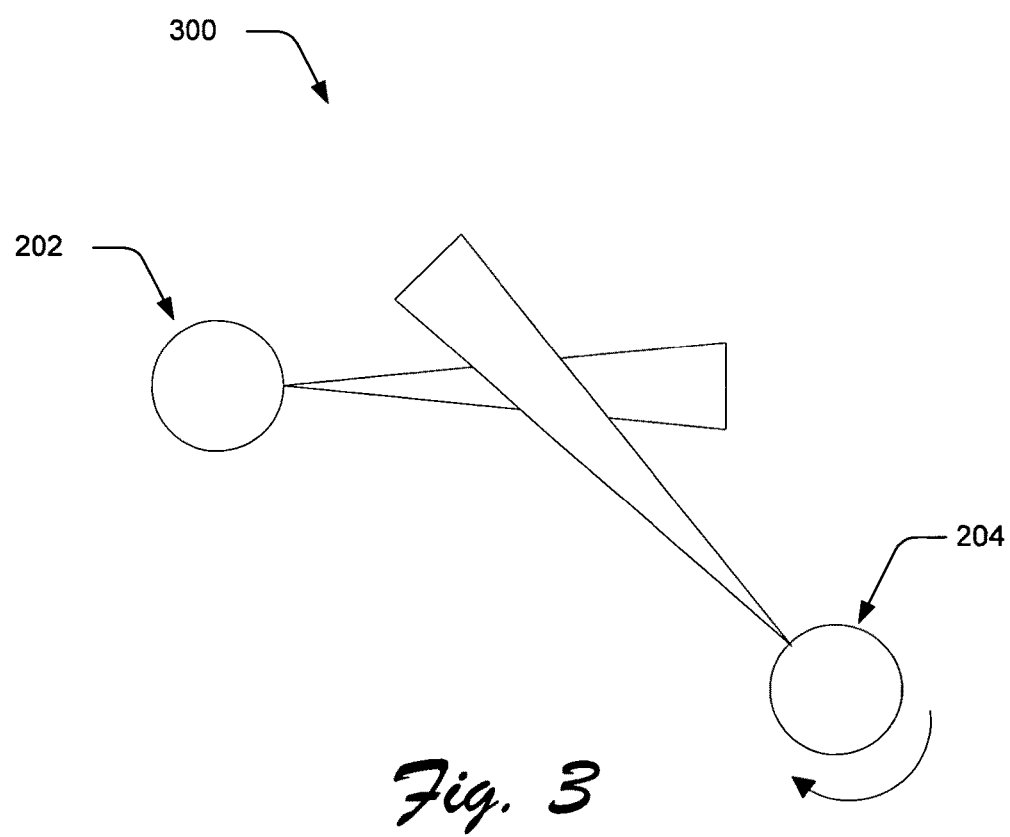
FIG. 3 is an illustration of an environment in an exemplary implementation that is operable to employ techniques to perform link adaptation in directional wireless networks.

However, as depicted in FIG. 3, the receiving station 204 is moved (e.g., a person moves a laptop) which causes the BF link between the transmitting station 202 and the receiving station 204 to break. Under this circumstance, none of the actions taken by traditional link adaptation algorithms may work. In general, the only way to reestablish communication between the two stations is by having the transmitting station 202 and the receiving station 204 recreate the beamforming in order to reestablish the broken link.

To reestablish a broken BF link requires the receiving station 204 to enter into an omni-receiver mode before the transmitter station 202 starts the beamforming procedure with the receiver station 204 to reestablish the link. Without the receiver station 204 entering the omni-receive mode before the transmitter station 202 starts the procedure to reestablish the BF link, the BF link may take longer to reestablish, if it gets reestablished at all, thus impacting data transmission rate. If the data transmission rate is compromised, applications relying upon the transmitted data will typically fail or have noticeable slowing, thus impacting a potential user's enjoyment.

To ensure that the receiver station 204 is in the omni-receive mode before the transmitter station 202 starts the procedure to reestablish the BF link, beamforming is implemented as part of the link adaptation algorithm. To accomplish this, the link adaptation algorithm implements a rule which provides for the transmitter to transmit a frame to the receiver within a prescribed period of time. If the receiver does not receive such a frame, the receiver then switches to omni-receive mode.

In additional to traditional actions (such as retransmission, MCS change, transmit power change, etc.) that can be employed by existing link adaptation algorithms that work under the omni-directional assumption, the availability of beamforming allows link adaptation algorithms to be augmented. This augmentation may include re-beamforming after the transmitting stations have attempted retransmission and MCS changes and failed to transmit a packet through to the receiver. Another augmentation of the adaptation algorithm might also include utilizing a backup BF link.

The transmitting station may have available multiple disjoint BF links with the receiving station. Hence, upon BF link breakage, the transmitter may resort to a backup BF link and attempt to use that to communicate with the receiver. Only if the backup beamformed (BF) links prove to also be broken would the transmitter initiate re-beamforming (BF).

Typically, station 202 and station 204 in FIGS. 2 and 3 setup either a service period (SP) or a transmit opportunity (herein after referred to as an allocation) that is used for frame exchange using their previously setup BF link. At any point in time during the allocation itself, or before the start of a forth coming allocation, the situation depicted in FIG. 3 can occur. When this happens, the link adaptation algorithm can perform actions such as retransmissions, MCS change, etc., in an attempt to recover the link. Before the link adaptation decides to restart beamforming, however, the system must know whether or not the receiver has already switched its receive antennas to an omni-receive mode.

To achieve this, the receiver station remains in directional mode when it communicates with a transmitter station if at least one of the following occurs:

The receiving station receives a contention free end (CF-End) frame from the transmitting station during an allocation between the transmitting station and the receiving station;

The receiving station receives a frame from the transmitting station within a time T before the end (or after the start) of an allocation between the transmitting station and the receiving station, where:

$$T=((\max\_PPDU\_size/MCS\_AB)+SIFS+ACK)$$

wherein max_PPDU_size is the maximum size of a PLCP (Physical Layer Convergence Procedure) protocol data unit (PHY PPDU), MCS_AB is the MCS used in the last successful fame exchange between the transmitting station and the receiving station, SIFS is short inter frame space and ACK is the time taken to transmit an acknowledgement (ACK) frame.

The receiving station waits for a period of time T from the start of an allocation for a frame originated at the transmitting station. The receiving station switches to omni-receive mode if it does not receive a frame from the transmitting station within T.

Figure 4:
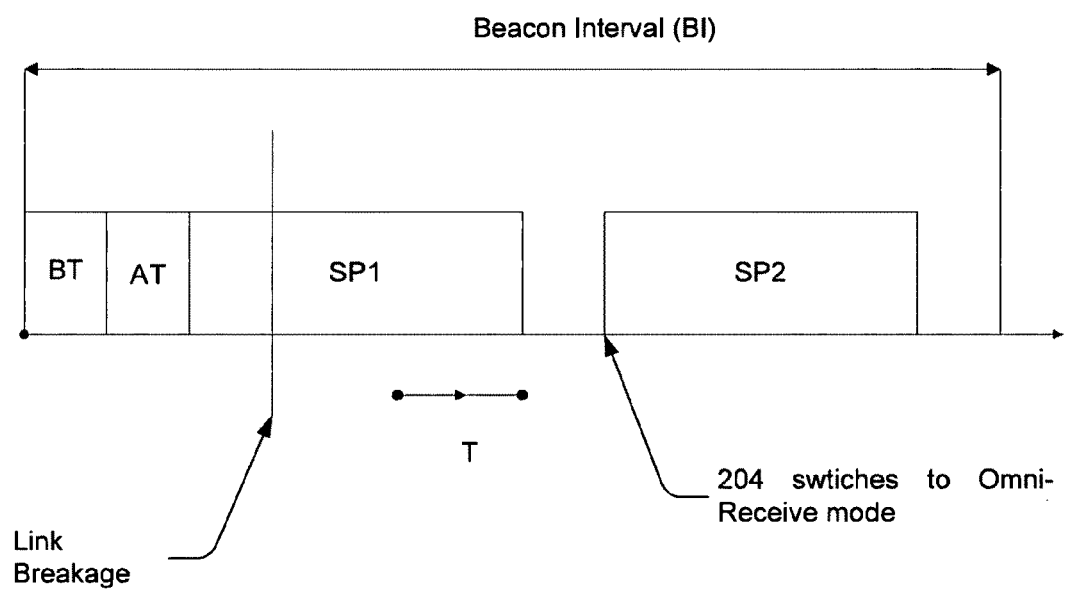
FIG. 4 is an illustration of a timing diagram implementing an embodiment of an exemplary implementation that is operable to employ techniques to perform link adaptation in directional wireless networks.

An example of the receiving station receiving a frame from the transmitting station within a time T before the end of an allocation between the transmitting station and the receiving station is illustrated in FIG. 4. In this example, the link between the transmitting station and the receiving station is broken (labeled as "Link Breakage") during the allocation (in this case an SP) between the transmitting station and the receiving station. Following the breakage which can be detected through unacknowledged frames, the link adaptation algorithm in the transmitting station may take actions such as frame retransmissions, MCS change, and may even restart BF with the receiving station during the allocation.

From the receiving station point of view, it simply stops receiving frames from the transmitting station. Since the interruption could be caused by multiple reasons, the receiving station may decide to remain in directional-receive mode or switch to omni-receive mode.

The receiving station expects to receive either a CF-End frame from the transmitting station or any frame during the period T before the end or start of the allocation. Conversely, the transmitting station knows that it needs to transmit a CF-End or any frame within the time T to the receiving station if it wants to avoid having the receiving station switch to omni-receive mode at the start of the next allocation between the two stations. In the example of FIG. 4, the receiving station does not receive any frames from the transmitting station after the link is broken and, in this case, switches to omni-receive mode at the start of the next allocation with the transmitting station. From the transmitting stations point of view, it knows that the receiving station will be in omni-receive mode at the start of the next allocation and thus it can restart BF with the receiving station at that time if it has not received an ACK packet. Alternatively if the transmitting station does not want to restart BF at the start of the next allocation, it can transmit a request-to-send (RTS) frame to the receiving station to attempt to recover the previous directional link.

Exemplary Procedures

The following discussion describes passive and active scanning techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1.

Figure 5:
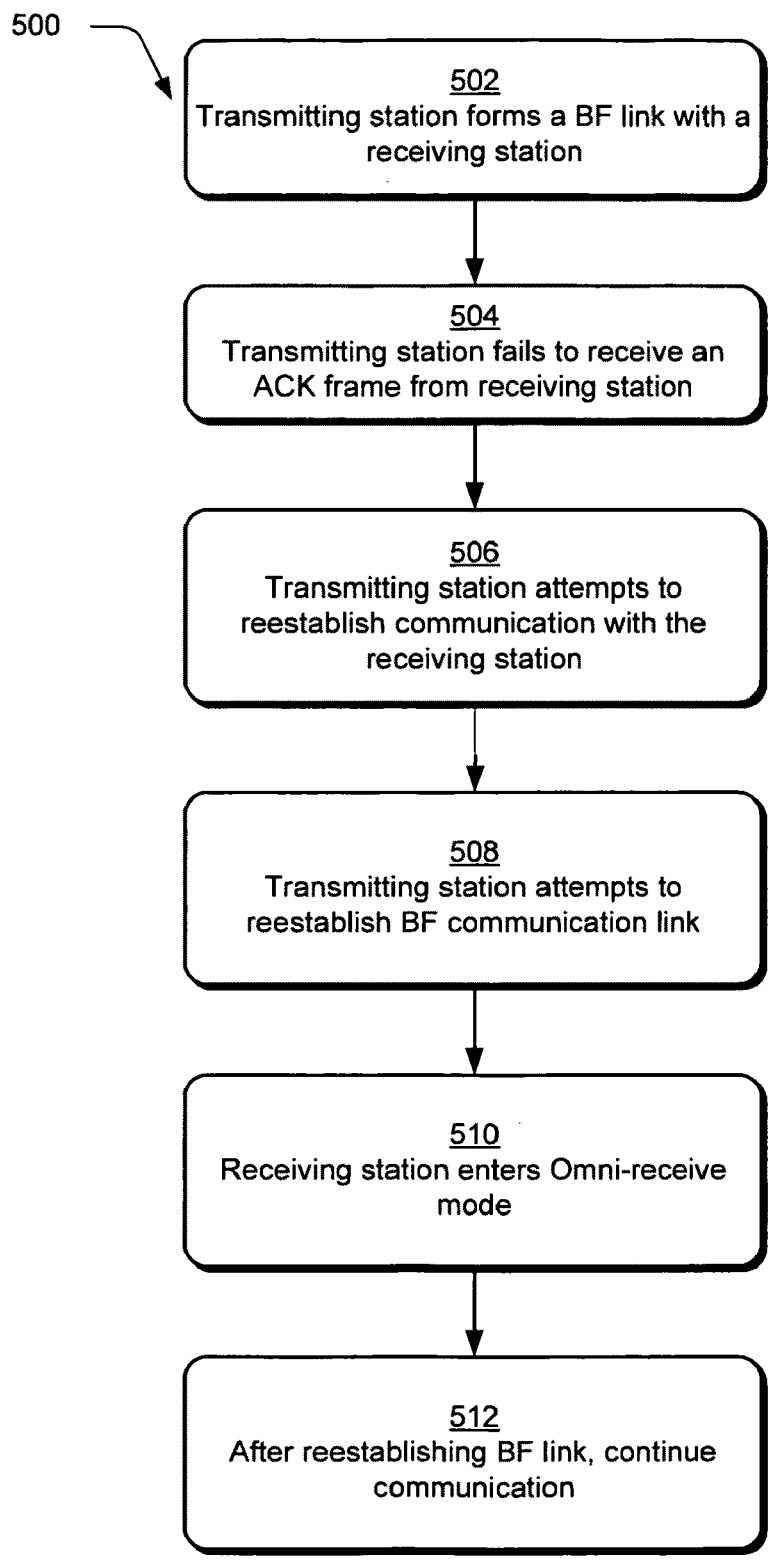
FIG. 5 is an exemplary flow chart depicting an exemplary procedure that employs techniques to perform link adaptation in directional wireless networks.

FIG. 5 depicts a procedure 500 in an exemplary implementation to employ techniques to perform link adaptation in directional wireless networks. Although this implementation describes adaptation performed by a wireless connection device, this scanning may be performed by a variety of devices.

A transmitting station forms a BF link with a receiving station (block 502) and transmits information. The transmitting and receiving stations generally are wireless connection devices utilizing an mmWave communication link that operate at 60 GHz.

After the BF link is formed, the transmitting station fails to receive an acknowledgment (ACK) frame from the receiving station. (Block 504). After a specified period of time, the transmitting station attempts to reestablish communication with the receiving station. (Block 506). The transmitting station first tries to reestablish communication by retransmitting the packet, changing the MCS and/or altering the transmit power.

If these first attempts to reestablish communication fails or a period predefined period of time occurs, the transmitting device prepares to reestablish the beamforming (BF) link at the start of the next allocation. (Block 508). The receiving station enters omni-receive mode at the beginning of the next allocation if it does not receive any frame from the transmitting station. (Block 510). After reestablishing the BF link, continuing communication between the two stations (Block 512).

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. An apparatus comprising:
   a transmitter to transmit packets over a beamformed wireless communication channel; and
   a link adaptation module, wherein the link adaptation module initiates reforming the beamformed wireless communication channel to reestablish wireless communication
   wherein the link adaptation module initiates reforming the beamformed wireless communication channel if the transmitter does not receive an acknowledgement (ACK) or block ACK packet from a receiving station in a predefined period of time (T), wherein the predefined period of time (T) is defined as:

$$T=((\text{max\_PPDU\_size}/\text{MCS}\_AB)+SIFS+\text{ACK})$$

wherein max_PPDU_size is the maximum size of a PLCP (Physical Layer Convergence Procedure) protocol data unit (PHY PPDU), MCS_AB is the MCS used in the last successful fame exchange between the transmitting station and the receiving station, SIFS is short interframe space and ACK is the time taken to transmit an acknowledgement (ACK) frame.

2. An apparatus as described in claim 1, wherein the link adaptation module employs one or more of the following: retransmission, changes to a modification coding setting (MCS), or changes to a transmission power to reestablish a communication link.

3. An apparatus as described in claim 1, wherein the link adaptation module initiates reforming the beamformed wireless communication channel if the transmitter does not receive an acknowledgement (ACK) or block ACK packet from a receiving station in a predefined period of time (T).

4. An apparatus as described in claim 1, wherein the link adaptation module initiates reforming the beamformed wireless communication channel if the transmitter does not receive an acknowledgement (ACK) or block ACK packet from a receiving station in a predefined period of time (T) that occurs before the end or after the start of an allocation period.

5. An apparatus comprising:
   a receiver to receive packets over a beamformed wireless communication channel; and
   a link adaptation module, wherein the link adaptation module switches the receiver into omni-receive mode to reestablish the communication channelwherein the link adaptation module initiates reforming the beamformed wireless communication channel to reestablish the communication channel and initiates reforming the beamformed wireless communication channel if the receiver does not receive a frame from a transmitting station in a predefined period of time (T),
   wherein the predefined period of time (T) is defined as:

$$T=((\text{max\_PPDU\_size}/\text{MCS}\_AB)+SIFS+\text{ACK})$$

wherein max_PPDU_size is the maximum size of a PLCP (Physical Layer Convergence Procedure) protocol data unit (PHY PPDU), MCS_AB is the MCS used in the last successful fame exchange between the transmitting station and the receiving station, SIFS is short interframe space and ACK is the time taken to transmit an acknowledgement (ACK) frame.

6. An apparatus as described in claim 5, wherein the predefined period of time (T) occurs before the end or after the start of an allocation period.

7. A method comprising:
establishing a beamformed wireless communication channel between a transmitter station and a receiver station; and
reestablishing the beamformed wireless communication channel between the transmitter station and the receiver station when communication is interrupted, wherein the receiver station enters an omni-receive mode after not receiving a frame for a predefined period of time (T),
wherein the predefined period of time (T) is defined as:

$$T=((\max\_PPDU\_size/MCS\_AB)+SIFS+ACK)$$

wherein max_PPDU_size is the maximum size of a PLCP (Physical Layer Convergence Procedure) protocol data unit (PHY PPDU), MCS_AB is the MCS used in the last successful fame exchange between the transmitting station and the receiving station, SIFS is short interframe space and ACK is the time taken to transmit an acknowledgement (ACK) frame.

8. A method as described in claim 7, wherein the transmitter station attempts to reestablish communication with the receiver station before reestablishing the beamformed wireless communication channel.

9. A method as described in claim 8, wherein the transmitter station attempts to reestablish communication with the receiver station by retransmitting a frame.

10. A method as described in claim 8, wherein the transmitter station attempts to reestablish communication with the receiver station by changing a modification and coding (MCS) setting.

11. A method as described in claim 8, wherein the transmitter station attempts to reestablish communication with the receiver station by changing a transmission power level.

12. A method as described in claim 7, wherein the predefined period of time (T) occurs before the end or after the start of an allocation period.

* * * * *